(12) United States Patent
Gerber

(10) Patent No.: US 6,386,353 B1
(45) Date of Patent: May 14, 2002

(54) ADJUSTABLE WORM CONVEYOR

(75) Inventor: Stephen M. Gerber, Petersburg, MI (US)

(73) Assignee: Owens-Brockway Glass Container Inc., Toledo, OH (US)

(*) Notice: Subject to any disclaimer, the term of this patent is extended or adjusted under 35 U.S.C. 154(b) by 0 days.

(21) Appl. No.: 09/676,001

(22) Filed: Sep. 29, 2000

(51) Int. Cl.[7] ............................................... B65G 33/02
(52) U.S. Cl. ................................... 198/467.1; 198/660
(58) Field of Search ........................... 198/467.1, 660, 198/657, 662, 666, 459.4

(56) References Cited

U.S. PATENT DOCUMENTS

| | | |
|---|---|---|
| 3,026,991 A | 3/1962 | Kinsley |
| 3,605,995 A * | 9/1971 | Maack ........................ 198/660 |
| 3,833,110 A | 9/1974 | Riggs |
| 3,856,131 A | 12/1974 | Flamand et al. |
| 5,392,928 A | 2/1995 | Nickey et al. |
| 5,697,489 A | 12/1997 | Deonarine et al. |
| 5,718,030 A | 2/1998 | Langmack et al. |

* cited by examiner

Primary Examiner—Kenneth W. Noland

(57) ABSTRACT

An helical worm gear conveyor (10, 110) for conveying a succession of articles (C) along a travel path (A), the conveyor having a first worm conveyor (14, 114) surrounded by a second worm conveyor (16, 116). The helixes of the second conveyor are positioned between the helixes of the first conveyor to divide the pockets (18, 118) defined by the helixes of the first conveyor into a first, article receiving portion and a second portion. The helixes of the second conveyor are laterally translatable relative to the first conveyor, by rotation (16) or without rotation (116), to vary the longitudinal extent of the article receiving portions of the pockets, as required for proper conveying of articles of a given size that differs from articles of another size.

4 Claims, 4 Drawing Sheets

ADJUSTABLE WORM CONVEYOR

FIELD OF THE INVENTION

This invention relates to a worm conveyor for conveying a plurality of like articles along a path of travel, that is, a conveyor in the form of a rotating member with an helical profile whose successive helixes define an article receiving pocket therebetween. More particularly, this invention relates to a worm conveyor of the foregoing type in which the length of the pocket defined by successive helixes, in a direction extending parallel to the path of travel of the conveyed articles, may be adjusted to accommodate articles when the like articles being conveyed change to different like articles of a different size.

BACKGROUND OF THE INVENTION

A prior art worm conveyor for conveying articles along a path of travel is disclosed in U.S. Pat. No. 5,392,928 (Nickey et al.), which is assigned to the assignee of this application, the disclosure of which is incorporated by reference herein. Worm conveyors of the type disclosed in the aforesaid '928 patent are widely used in the glass container manufacturing industry to convey a plurality of like glass containers, in succession, between various locations in a manufacturing plant, for example, from an annealing lehr to and from an inspection station. Each such worm container is in the form of an elongate rotating member with an external helical thread, each pair of successive helixes of the worm conveyor defining a container receiving pocket. Rotation of the worm conveyor around an axis extending longitudinally through the worm conveyor has the effect of gently advancing a succession of containers in a plurality of such pockets along a path of travel that extends parallel to the axis of rotation of the worm conveyor.

A typical glass container manufacturing plant operates to produce containers in a wide range of sizes, and it is often necessary to replace a worm conveyor when changing container sizes to provide a proper match between the size of the containers being run at a given time and the sizes of the pockets in the worm conveyor, because such worm conveyors are often used as timing devices, and any extra clearance between pocket size and container size has an adverse effect on the timing accuracy of the processing station to which the containers are being conveyed. Further, such worm conveyor replacement is time consuming, resulting in some loss of the productive capacity of the processing line in which the worm conveyor is installed, and the need to inventory a large number of worm conveyors to accommodate all container sizes to be conveyed along such processing line is expensive in terms of equipment cost and storage cost.

Accordingly, it is an object of the present invention to provide a worm conveyor that is adapted to convey a wide range of article sizes along a path of travel without the need to replace the worm conveyor when changing the articles being conveyed from articles of a given size to articles of a somewhat greater or lesser size. More particularly, it is an object of the present invention to provide a worm conveyor of the foregoing type with article conveying pockets that are adjustable in a dimension extending parallel to the path of travel of the articles when changing the sizes of the articles being conveyed without excessively increasing or decreasing clearance between each article and the pocket in which it is received, to thereby avoid negatively impacting the timing accuracy of any processing device to which the articles are being conveyed. Even more particularly, it is an object of the present invention to provide a worm conveyor with pockets that are adjustable in a dimension extending parallel to the path of travel of the articles that is suited for conveying freshly formed glass containers of various sizes between various locations in a glass container manufacturing plant.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
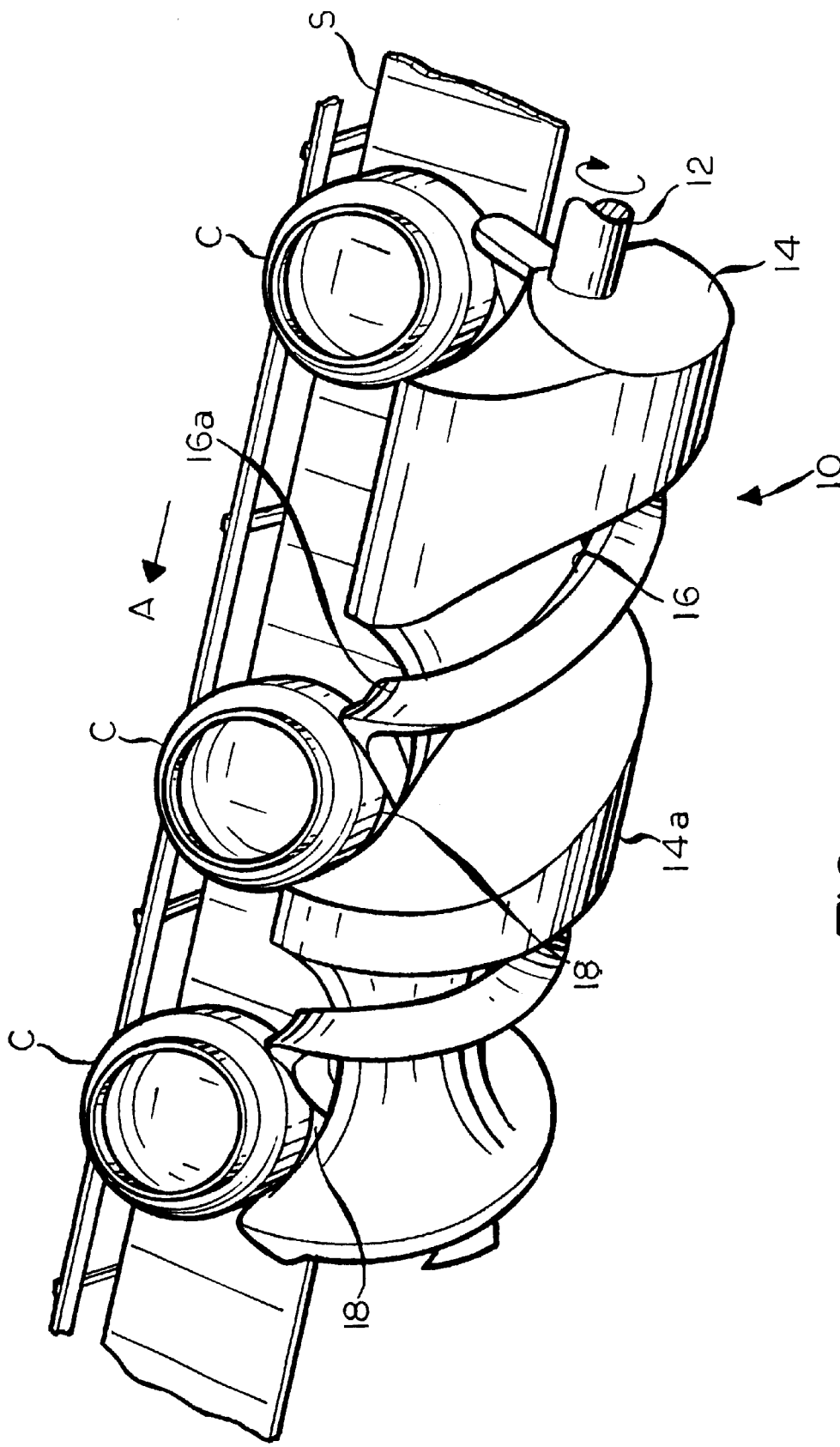
FIG. 1 is a fragmentary perspective view showing an adjustable worm conveyor according to an embodiment of the present invention in operation in conveying glass containers along a path of travel.
Figure 2:
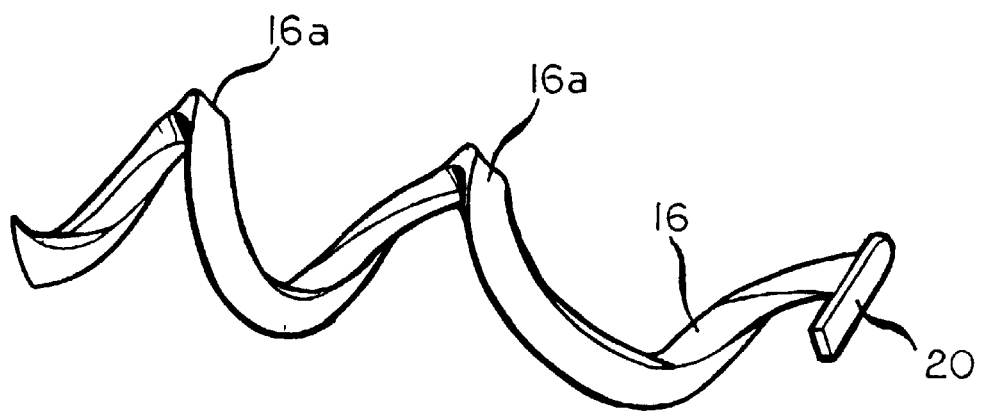
FIG. 2 is a fragmentary perspective view showing an element of the adjustable worm conveyor of FIG. 1.
Figure 3:
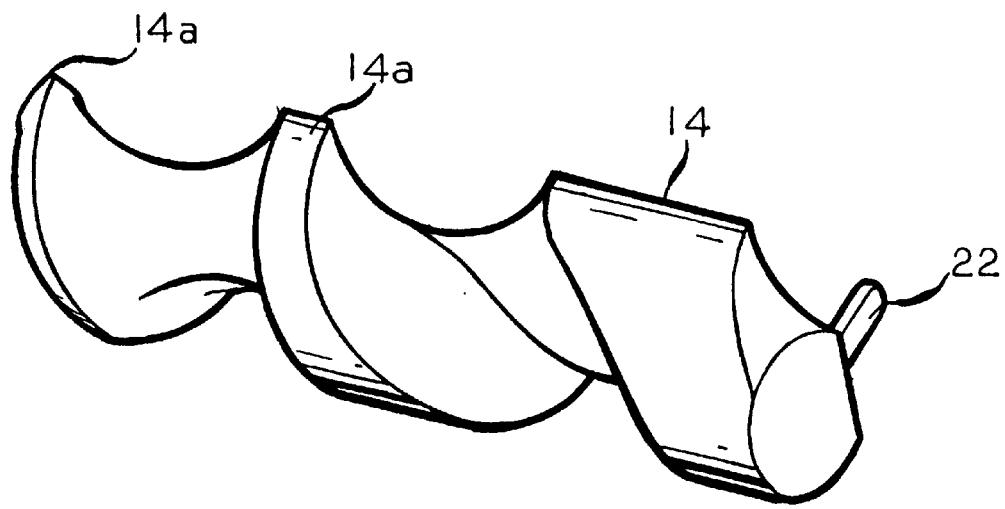
FIG. 3 is a fragmentary perspective view showing another element of the adjustable worm conveyor of FIG. 1.
Figure 4:
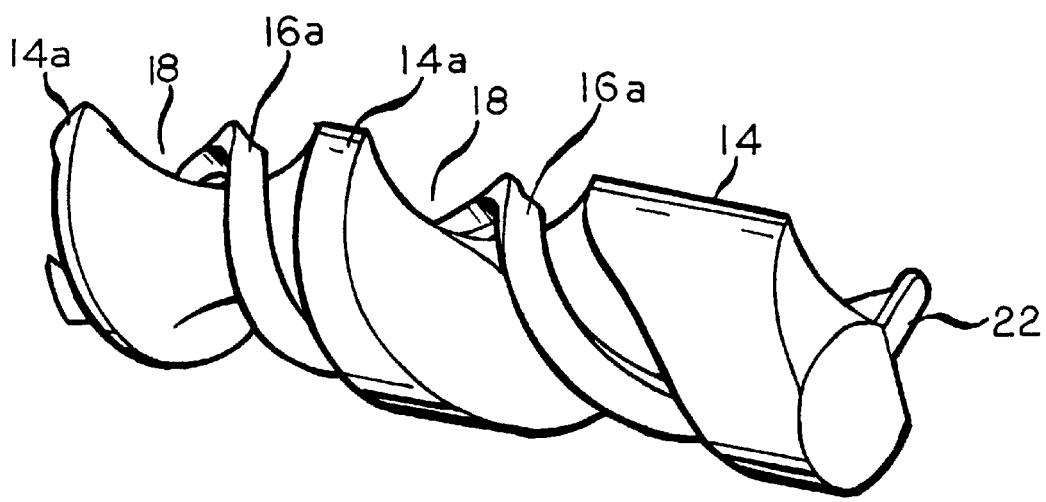
FIG. 4 is a fragmentary perspective view showing the elements of FIGS. 1 and 2 in assembled relationship with one another.
Figure 5:
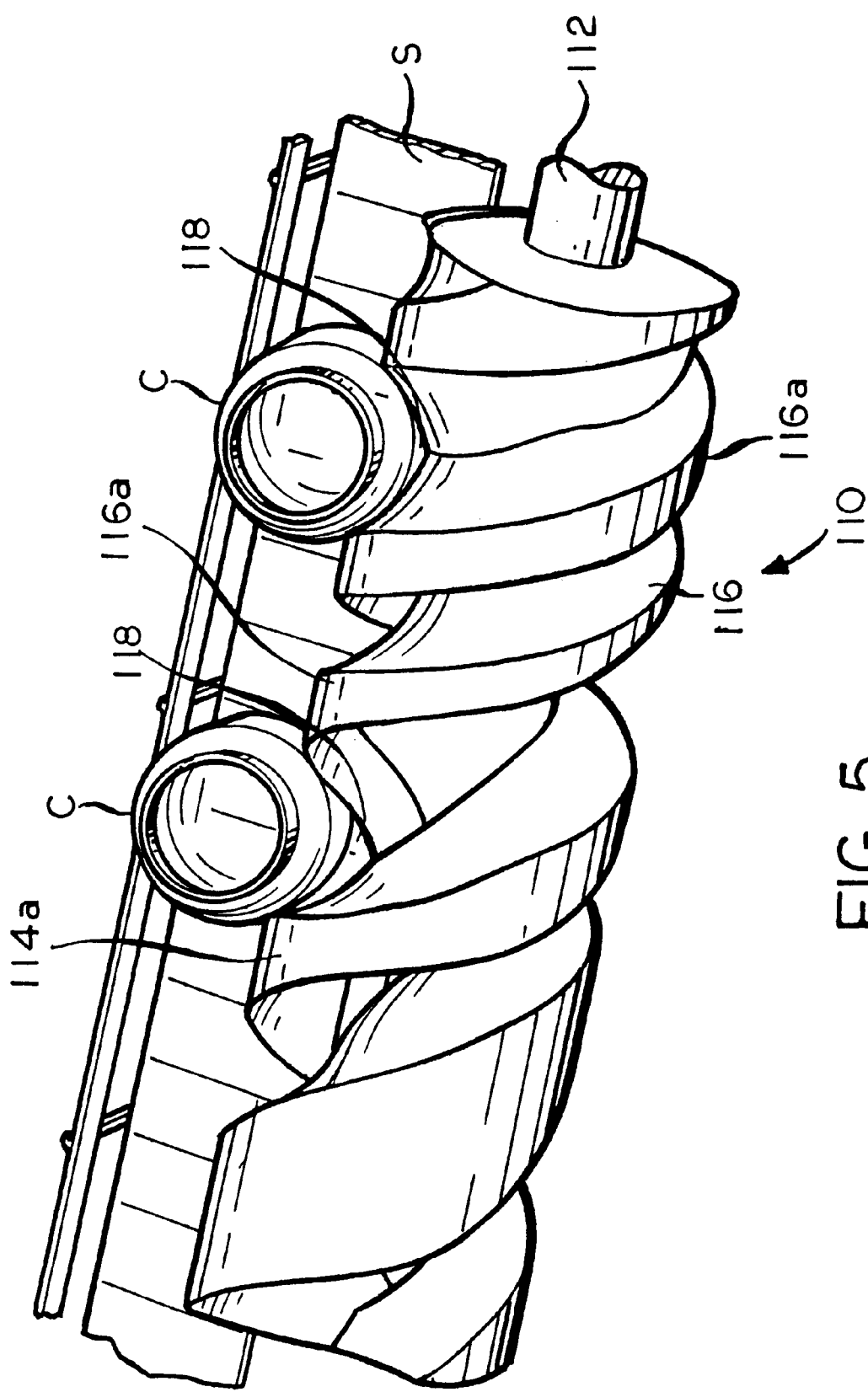
FIG. 5 is a view like FIG. 1 showing an adjustable worm conveyor according to an alternative embodiment of the present invention.
Figure 6:
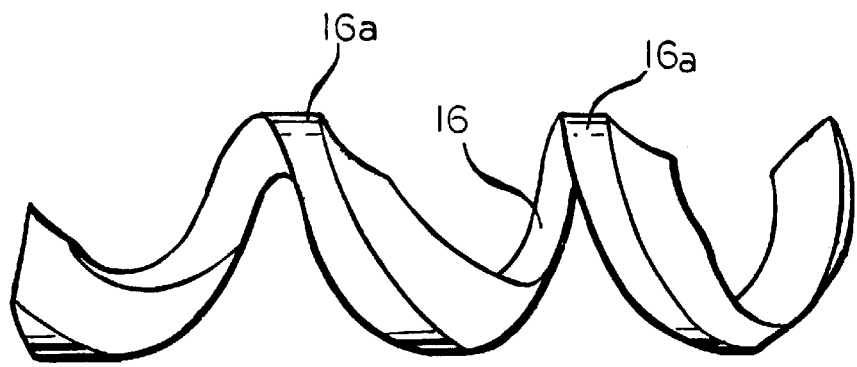
FIG. 6 is a fragmentary perspective view showing an element of the adjustable worm conveyor of FIG. 5.
Figure 7:
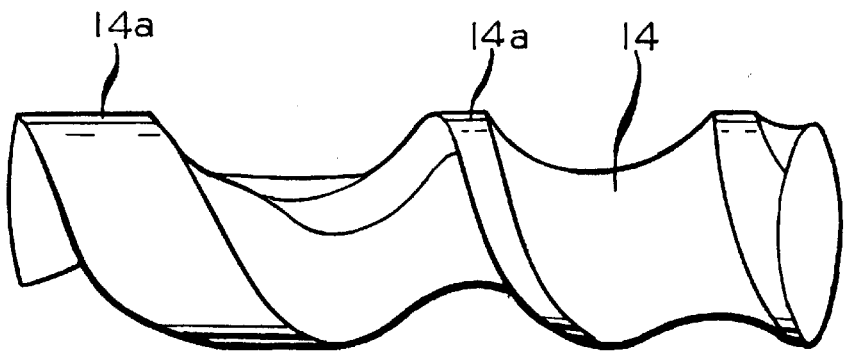
FIG. 7 is a fragmentary perspective view showing another element of the adjustable worm conveyor of FIG. 5.
Figure 8:
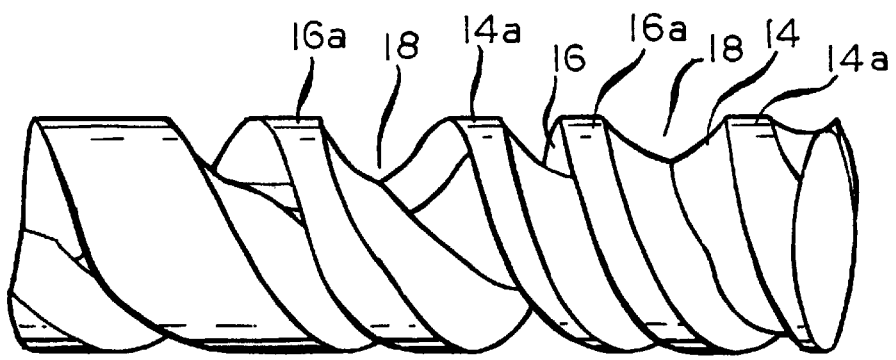
FIG. 8 is a fragmentary perspective view showing the elements of FIGS. 6 and 7 in assembled relationship with one another.

A worm conveyor assembly according to the embodiment of FIGS. 1–4 is identified generally by reference numeral 10 in FIG. 1. The worm conveyor assembly 10 is used to successively convey a plurality of like glass containers C along a surface S in a direction extending along a path of travel identified by an arrow A when the worm conveyor assembly 10 is rotated by turning a shaft 12 that extends through the longitudinal central axis of the worm conveyor assembly 10. The worm conveyor assembly 10 is made up of a longitudinally extending first worm conveyor 14 with an outer helical thread 14a extending therealong, and a longitudinally extending second conveyor 16 with an outer helical thread 16a extending therealong.

The second worm conveyor 16 concentrically surrounds the first worm conveyor 14 so that each helical thread 16a of the second worm conveyor 16 and each adjacent helical thread 14a of the first worm conveyor 14 defines a pocket 18 for receiving one of the containers C. In service, the pockets 18 of the worm conveyor assembly 10 are of the same size, and it is of a size that is carefully matched to the size of the containers C to provide proper, but not excessive, clearance for the containers C within the pockets 18. In this way, each container C is accurately positioned when it reaches its intended destination, for example, a starwheel that feeds an electronic inspection machine for inspecting a succession of containers C for compliance with various quality requirements, such as the arrangement taught by the aforesaid '928 patent.

The second worm conveyor 16 is provided with a mounting bar 20 at an end thereof, and the mounting bar 20 is adapted to be secured at one or another of various fixed locations at an end of the first worm conveyor 14, which is also provided with a mounting bar 22 at an end thereof to which the mounting bar 20 is secured, the mounting bars 20, 22 being pivotable, before tightening, with respect to the second worm conveyor 16, first worm conveyor 14, respectively. Thus, to change the dimensions of the pockets 18 along the path of travel A, to thereby accommodate like containers C of a different diameter than the like containers C being previously processed by the worn conveyor assembly 10, it is only necessary to rotate the second worm conveyor 16 relative to the first worm conveyor 14 to establish the proper dimensions for the pockets 18 for the new like containers C, whereupon the positions of the second worm conveyor 16, first worm conveyor 14 can again be fixed until the next time it is desired to change to processing of like containers C of a different size. Such rotation of the second worm conveyor 16 relative to the first worm conveyor 14 will have the effect of laterally translating an helical thread 16a relative to an adjacent helical thread 14a that defines a given pocket 18, to thereby increase or decrease the axially extending dimension of the pocket 18, as desired.

In the embodiment of FIGS. 5–8, elements that are identified by numerals are identified by 100 series numerals, the last two digits of which correspond to the two digits of corresponding elements, if any, of the embodiment of FIGS. 1–4. A worm conveyor assembly according to the embodiment of FIGS. 5–8 is identified generally by reference numeral 110 in FIG. 5. The worm conveyor assembly 110 is used to successively convey a plurality of like glass containers C along a surface S in a direction extending along a path of travel identified by an arrow A. The worm conveyor assembly 110 is rotated by turning a shaft 112 that extends through the longitudinal central axis of the worm conveyor assembly 10. The worm assembly 110 is made up of a longitudinally extending first worm conveyor 114 with an outer helical thread 114a extending therealong, and a longitudinally extending second worm conveyor 116 with a longitudinally extending helical thread 116a extending therealong.

The second worm conveyor 116 concentrically surrounds the first worm conveyor 114 so that each helix 116a of the second worm conveyor 116 and each adjacent helix 114a of the first worm conveyor 114 defies a pocket 118 for receiving any one of the containers C. In service, the pockets 118 of the worm conveyor assembly 110 are of the same size, and it is of a size that is carefully matched to the size of the containers C to provide proper, but not excessive, clearance for the containers C within the pockets 118 so that each container C is accurately positioned when it reaches its intended destination. Such intended destination may be, for example, a starwheel that feeds an electronic inspection machine for inspecting a succession of containers C for compliance with various quality requirements, such as the arrangement taught by the aforesaid '928 patent.

To change the dimension of the pocket 118 along the path of travel A, to thereby accommodate like containers C of a different diameter than that of the like containers C previously being processed by the worm conveyor assembly 110, it is only necessary to laterally translate, without rotation, the second worm conveyor 116 relative to the first worm conveyor 114 along the longitudinal central axis of the conveyor 114 to establish the proper dimension for the pockets 118 for the new like containers C. This may be done, for example, by tightening a set screw (not shown) extending through one of the flights of the second worm conveyor 116 to frictionally engage an interior portion of the first worm conveyor 114. In this manner, the first worm conveyor 114 and the second worm conveyor 116 are properly fixed in position relative to one another, until the next time when it is desired to change the processing of like containers C of a different size. In this manner, the lateral extent of the pockets 118 of the worm conveyor assembly 110 can be increased or decreased, as desired, as dictated by the diameters of the like containers C being processed at any given time.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. An adjustable worm gear assembly for advancing a plurality of like objects along a path of travel, said worm gear assembly comprising:

a first worm gear, said first worm gear having a longitudinal central axis of rotation and an helical groove on an outer surface, said helical groove defining a longitudinally extending plurality of pockets; and a second worm gear concentrically surrounding said first worm gear and being translatable with respect to the first worm gear along the longitudinal central axis of the first worm gear, said second worm gear having an helical thread positioned within the helical groove of the first worm gear, a helix of said second worm gear, in combination with an helix of the first worm gear, acting to subdivide one of the plurality of pockets into a first, object receiving portion and a second portion;

translation of said second worm gear relative to said first worm gear along the longitudinal central axis of said first worm gear being effective to change the longitudinal extent of each of the first, object receiving portions of the pockets of the first worm gear to permit the adjustable worm gear assembly to satisfactorily convey pluralities of like objects of widely varying size along the path of travel.

2. An adjustable worm gear assembly according to claim 1 wherein said second worm gear is translatable with respect to said first worm gear by rotation of said second worm gear with respect to said first worm gear.

3. An adjustable worm gear assembly according to claim 1 wherein translation of said second worm gear with respect to said first worm gear is accomplished without rotation of said second worm gear with respect to said first worm gear.

4. An adjustable worm gear assembly according to claim 1 wherein the plurality of like objects consist of a plurality of freshly formed glass containers.

* * * * *